(12) United States Patent
Shibata et al.

(10) Patent No.: US 9,821,595 B2
(45) Date of Patent: Nov. 21, 2017

(54) FILM FOR IN-MOLDING, IN-MOLD MOLDED PRODUCT, AND METHOD FOR MANUFACTURING IN-MOLD MOLDED PRODUCT

(71) Applicant: Panasonic Intellectual Property Management Co., Ltd., Osaka (JP)

(72) Inventors: Gakuei Shibata, Osaka (JP); Kazuhiko Kaneuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/327,370

(22) PCT Filed: Nov. 27, 2015

(86) PCT No.: PCT/JP2015/005903
§ 371 (c)(1),
(2) Date: Jan. 18, 2017

(87) PCT Pub. No.: WO2016/194027
PCT Pub. Date: Dec. 8, 2016

(65) Prior Publication Data
US 2017/0203608 A1    Jul. 20, 2017

(30) Foreign Application Priority Data

Jun. 4, 2015 (JP) .................................. 2015-113544

(51) Int. Cl.
*B44C 1/17* (2006.01)
*B32B 3/08* (2006.01)
(Continued)

(52) U.S. Cl.
CPC ........ *B44C 1/1704* (2013.01); *B29C 45/1418* (2013.01); *B29C 45/14336* (2013.01);
(Continued)

(58) Field of Classification Search
CPC ........ B29C 45/14811; B29C 45/14836; B29K 2105/16; B29K 2709/00; B29K 2995/002; B29K 2995/007
See application file for complete search history.

(56) References Cited

U.S. PATENT DOCUMENTS

8,652,596 B2 * 2/2014 Kaneuchi .......... B29C 45/14827
428/32.52
2004/0183229 A1    9/2004 Kunzel et al.
(Continued)

FOREIGN PATENT DOCUMENTS

JP        3-136900        6/1991
JP       2003-246194      9/2003
(Continued)

OTHER PUBLICATIONS

International Search Report of PCT application No. PCT/JP2015/005903 dated Feb. 2, 2016.

*Primary Examiner* — Betelhem Shewareged
(74) *Attorney, Agent, or Firm* — Panasonic IP Management; Kerry S. Culpepper

(57) ABSTRACT

A film for in-molding is configured with a transfer film which is transferred to a surface of an injection molding resin, and a carrier film which is not transferred. The transfer film includes a coloring layer which includes ink which is an organic material formed of a thermoplastic resin and applies a design to an in-mold molded product, and inorganic polymer layers formed of a thermosetting resin, and the coloring layer comes into contact with the inorganic polymer layers and is interposed between the inorganic polymer layers.

9 Claims, 10 Drawing Sheets

(51) Int. Cl.
  *B32B 27/00* (2006.01)
  *B29C 45/14* (2006.01)
  *B29L 31/00* (2006.01)
  *B29L 31/30* (2006.01)
  *B29K 709/00* (2006.01)
  *B29K 105/16* (2006.01)
(52) U.S. Cl.
  CPC .. *B29C 45/14688* (2013.01); *B29C 45/14811* (2013.01); *B29C 45/14827* (2013.01); *B29C 45/14836* (2013.01); *B32B 3/08* (2013.01); *B32B 27/00* (2013.01); *B29C 2045/14713* (2013.01); *B29K 2105/16* (2013.01); *B29K 2709/00* (2013.01); *B29K 2995/002* (2013.01); *B29K 2995/007* (2013.01); *B29L 2031/30* (2013.01); *B29L 2031/722* (2013.01); *B32B 2451/00* (2013.01); *B32B 2605/003* (2013.01)

(56) References Cited

U.S. PATENT DOCUMENTS

| | | | |
|---|---|---|---|
| 2012/0237702 A1* | 9/2012 | Kaneuchi | B29C 45/14827 428/32.69 |
| 2013/0049267 A1 | 2/2013 | Arai et al. | |
| 2015/0064371 A1 | 3/2015 | Kaneuchi et al. | |
| 2017/0203608 A1* | 7/2017 | Shibata | B44C 1/1704 |

FOREIGN PATENT DOCUMENTS

| | | |
|---|---|---|
| JP | 2010-247493 | 11/2010 |
| JP | 2013-043361 | 3/2013 |
| JP | 2014-037084 | 2/2014 |
| JP | 2015-047857 | 3/2015 |

* cited by examiner

FILM FOR IN-MOLDING, IN-MOLD MOLDED PRODUCT, AND METHOD FOR MANUFACTURING IN-MOLD MOLDED PRODUCT

CROSS-REFERENCE TO RELATED APPLICATIONS

This application is a U.S. national stage application of the PCT International Application No. PCT/JP2015/005903 filed on Nov. 27, 2015, which claims the benefit of foreign priority of Japanese patent application No. 2015-113544 filed on Jun. 4, 2015, the contents all of which are incorporated herein by reference.

TECHNICAL FIELD

The present invention relates to a film for in-molding, an in-mold molded product, and a method for manufacturing the same. The invention more specifically relates to a highly heat-resistant film for in-molding capable of withstanding high temperature at the time of resin molding, an in-mold molded product obtained using the highly heat-resistant film for in-molding, and a method for manufacturing the same.

BACKGROUND ART

In recent years, technologies relating to vehicles generally used have rapidly changed. For aiming environmental consideration and high efficiency of an engine, a fuel has been developed from gasoline to hybrid, fuel cells, and hydrogen batteries. A large number of resin molded products is used in the interior of vehicles, in order to reduce a weight, and the development of interior decoration of vehicles has been proceeded in accordance with the usage of the resin molded products to change the interior of the vehicles into a comfortable space. Accordingly, decorative objects of the vehicles are extremely highly needed.

Even in such an environment, in-mold molded products are not sufficiently used in the interior of vehicles. This is because that high-strength polycarbonate or the like is used as a resin of the interior of vehicles, but a film for in-molding capable of sufficiently withstanding a molding temperature thereof is not provided and defects of appearance occur in a process of manufacturing a molded product. In addition to the interior of vehicles, polycarbonate or the like is also used as a resin for molding in the exterior of vehicles or the exterior of smart phones, and the same problems described above occur. Hereinafter, a film for in-molding, an in-mold molded product, and a method for manufacturing the same of the related art will be introduced.

FIG. 7 shows a layer configuration of a film for in-molding of the related art. A film for in-molding disclosed in PTL 1 also has the same layer configuration as that of the related art. The film for in-molding is configured with carrier film 401 which is not transferred to an injection molding resin and transfer film 402 which is transferred to the injection molding resin.

Carrier film 401 is configured with base film 403 which is formed of a PET or acrylic film which continuously supplies transfer film 402, and peeling layer 404 for peeling transfer film 402 from base film 403. Transfer film 402 is configured with protective layer or hard coat layer 405, primer layer 406, coloring layer 408, hiding layer 410, and adhesive layer 411. Protective layer or hard coat layer 405 is an outermost surface of an in-mold molded product and has a function of protecting transfer film 402 from scratches or contaminations. Primer layer 406 has a function of connecting protective layer or hard coat layer 405 and coloring layer 408 to each other. Coloring layer 408 includes ink which is an organic material and has a function of applying a color, a pattern, or a design to a surface of an in-mold molded product. Hiding layer 410 has a function of hiding a color of coloring layer 408 and adhesive layer 411 has a function of bonding transfer film 402 to an injection molding resin. As described above the film for in-molding is configured with a plurality of layers.

FIG. 8 schematically shows a method for manufacturing an in-mold molded product of the related art. In the method for manufacturing an in-mold molded product of the related art, film for in-molding 604 described with reference to FIG. 7 is fixed to movable die 606 by using film pressing members 609. Then, film for in-molding 604 is sufficiently shaped so that film for in-molding 604 is sucked by suction holes 608 and bonded to a surface of a die of movable die 606.

After that, a cavity is formed between fixed die 605 and movable die 606 with film for in-molding 604 interposed therebetween, and molten injection molding resin 612 is injected from gate 611 to fill the cavity. After the cavity is filled with injection molding resin 612, injection molding resin 612 is cooled and solidified. When movable die 606 is moved, the transfer film of the film for in-molding is peeled off from the base film and an in-mold molded product in which a transfer film is formed on a surface of injection molding resin 612 is obtained.

CITATION LIST

Patent Literature

PTL 1: Japanese Patent Unexamined Publication No. 2003-246194

SUMMARY OF THE INVENTION

However, in the layer configuration of the film for in-molding of the related art described above, when in-molding is performed using a molding resin such as polycarbonate and a resin obtained by including a glass filler to the molding resin, a so-called gate mark failure is generated. A gate mark is a phenomenon in which ink of a coloring layer in the vicinity of a gate of a molded product does not withstand an injection molding temperature of a resin to be injected and flows towards a protective layer or a hard coat layer. Due to occurrence of such failure, a quality of appearance of an in-mold molded product is significantly deteriorated. Meanwhile, when an injection molding temperature is set to be low, in order to prevent the generation of the gate mark, the injection molding resin is not spread over the entire die and failure such as filling insufficiency occurs. There are two problems in a so-called trade-off relationship. That is, in a case of performing in-molding using the resin, the molding is not performed at a predetermined high temperature, and accordingly, high heat resistance is necessary for the film for in-molding.

A method of improving heat resistance of the film for in-molding by mixing 2 liquid curing type ink in the coloring layer is used, but when 40% by weight or more of a curing agent is included in the resin which is a main agent, the film hardly functions as a film due to cracks generated on the film, and in a case of a film in which the content of the curing agent is equal to or greater than 30% and less than 40% by weight, cracks are not generated, but the gate mark is generated.

The invention has been made to solve the aforementioned problems of the related art and an object thereof is to prevent occurrence of defects in an in-mold molded product.

A film for in-molding of the invention comprising a transfer film which is transferred to a surface of an injection molding resin; and a carrier film which is not transferred. The transfer film includes a coloring layer which includes ink which is an organic material formed of a thermoplastic resin and applies a design to an in-mold molded product, and inorganic polymer layers formed of a thermosetting resin, and the coloring layer is into contact with the inorganic polymer layers and is interposed between the inorganic polymer layers.

According to the invention, when the coloring layer is interposed between the inorganic polymer layers, it is possible to prevent an ink flow to the coloring layer and to prevent occurrence of defects in an in-mold molded product.

DESCRIPTION OF EMBODIMENTS

Exemplary Embodiment 1

Figure 1:
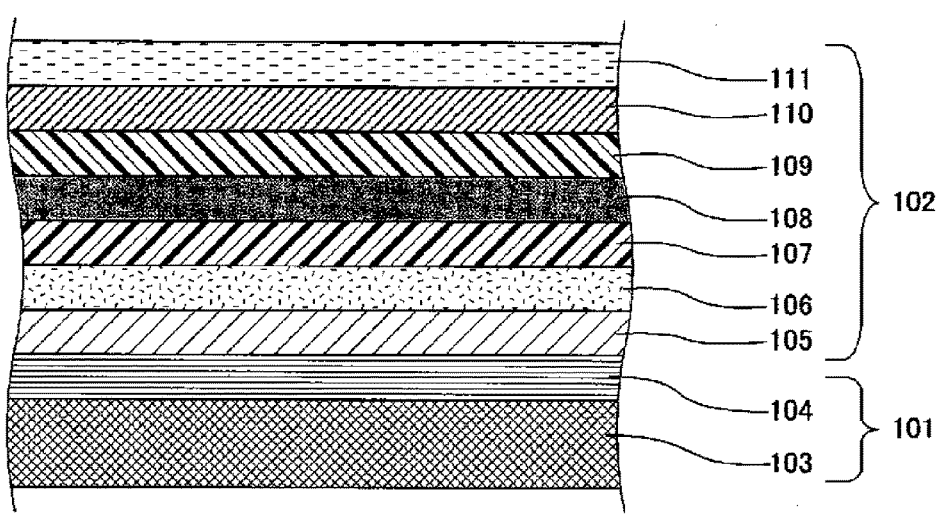
FIG. 1 is an enlarged sectional view of an in-mold molded product of Exemplary Embodiment 1 of the invention.

FIG. 1 shows a layer configuration of a film for in-molding of Exemplary Embodiment 1 of the invention. As shown in FIG. 1, the film for in-molding of this exemplary embodiment is a continuous film configured with carrier film 101 and transfer film 102.

Carrier film 101 is a portion of the film for in-molding which is not transferred to an injection molding resin and is configured with base film 103 and peeling layer 104. Base film 103 has a function of continuously supplying transfer film 102. Peeling layer 104 is used for peeling transfer film 102 from base film 103.

Transfer film 102 is a portion of the film for in-molding which is transferred to an injection molding resin. Transfer film 102 is generally configured to have a film thickness of 2 μm to 50 μm inclusive. Transfer film 102 is, for example, configured with protective layer or hard coat layer 105, primer layer 106, first inorganic polymer layer 107, coloring layer 108, second inorganic polymer layer 109, hiding layer 110, and adhesive layer 111, and transfer film 102 is, for example, configured so that a thickness of a layer having the greatest film thickness becomes 10 μm.

Protective layer or hard coat layer 105 is an outermost surface of an in-mold molded product and has a function of protecting transfer film 102 from scratches or contaminations. Primer layer 106 has a function of connecting protective layer or hard coat layer 105 and first inorganic polymer layer 107 to each other. Coloring layer 108 includes ink which is an organic material formed of a thermoplastic resin, and has a function of applying a color, a pattern, or a design to a surface of an in-mold molded product. Hiding layer 110 has a function of hiding a color of coloring layer 108 and adhesive layer 111 has a function of bonding transfer film 102 to an injection molding resin. Here, adhesive layer 111, hiding layer 110, coloring layer 108, and primer layer 106 are respectively organic materials formed of a thermoplastic resin. Peeling layer 104 may not be provided on base film 103, as long as a material has peeling properties, even when protective layer or hard coat layer 105 is directly formed on base film 103.

Unlike the film for in-molding of the related art, the film for in-molding of the invention has a layer configuration in which transfer film 102 includes first inorganic polymer layer 107 and second inorganic polymer layer 109, and inorganic polymer layers 107 and 109 come into contact with coloring layer 108 and interpose coloring layer 108. Here, inorganic polymer layers 107 and 109 are respectively formed of a thermosetting resin. When this layer configuration is used, it is possible to prevent generation of a gate mark failure, when manufacturing an in-mold molded product. Hereinafter, the details thereof will be described.

The inventors had made intensive investigations regarding reasons and measures of generation of a gate mark, in order to prevent generation of a gate mark failure in an in-mold molded product. In the initial stage of the investigation, as the reason of the generation of a gate mark, it was thought that a gate mark is generated due to an injection molding resin flowing from an adhesive layer to a coloring layer due to injection pressure and injection heat of an injection resin. However, even when injection pressure was slowly decreased, a state of the generation of the gate mark did not change, and accordingly, it was thought that the main reason of the generation of the gate mark is because of injection heat, not injection pressure. When a gate mark portion was microscopically observed, it was found that, ink of the coloring layer was not melted by injection heat, but when the temperature of each layer respectively approached a glass transition temperature, fluidity was applied to each layer, and shearing was applied to a flow direction of the injection resin, and a gate flow occurred to cause a gate mark.

Figure 2:
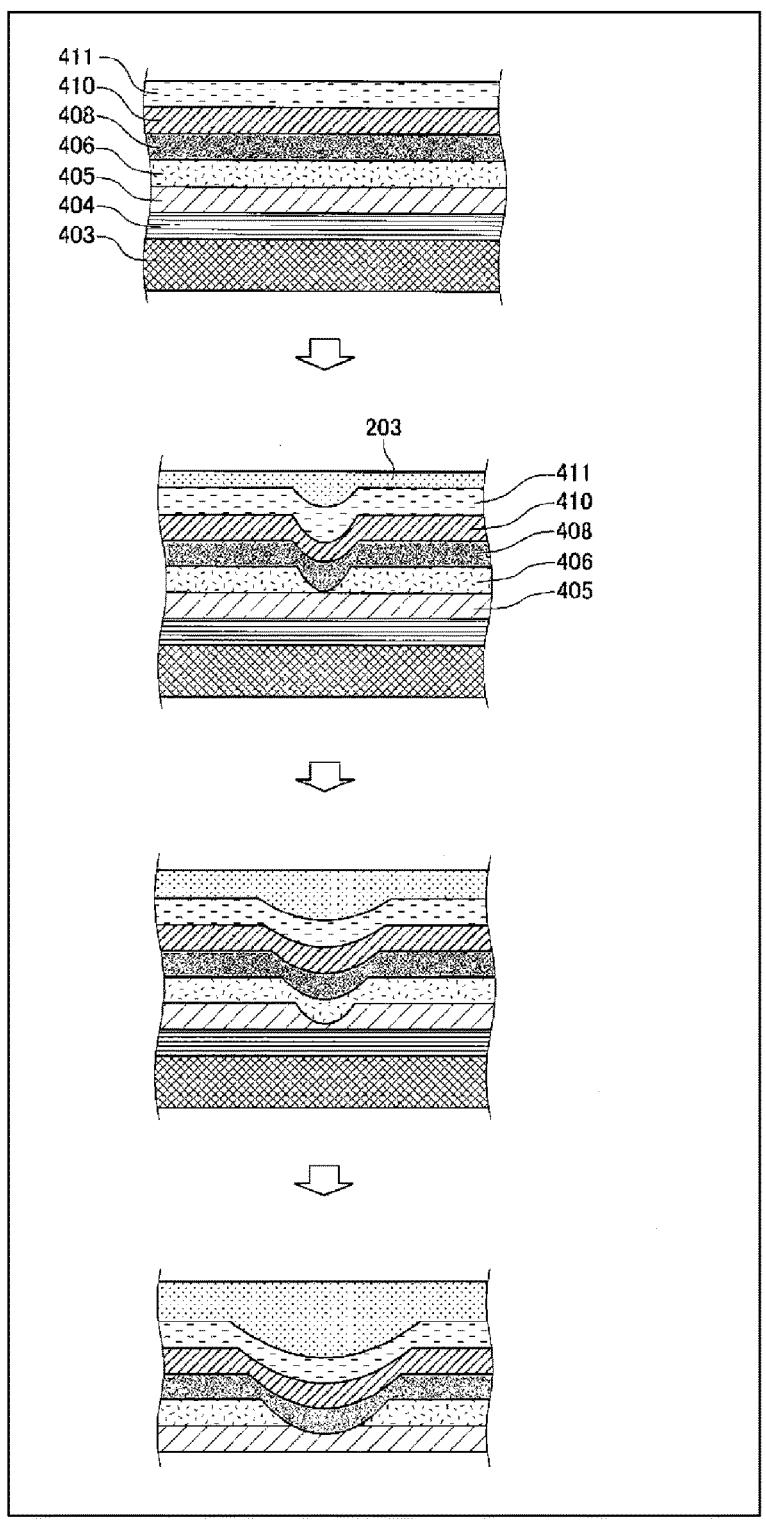
FIG. 2 is a diagram explaining a mechanism of generating a gate mark failure in an in-molding method of the related art.
Figure 7:
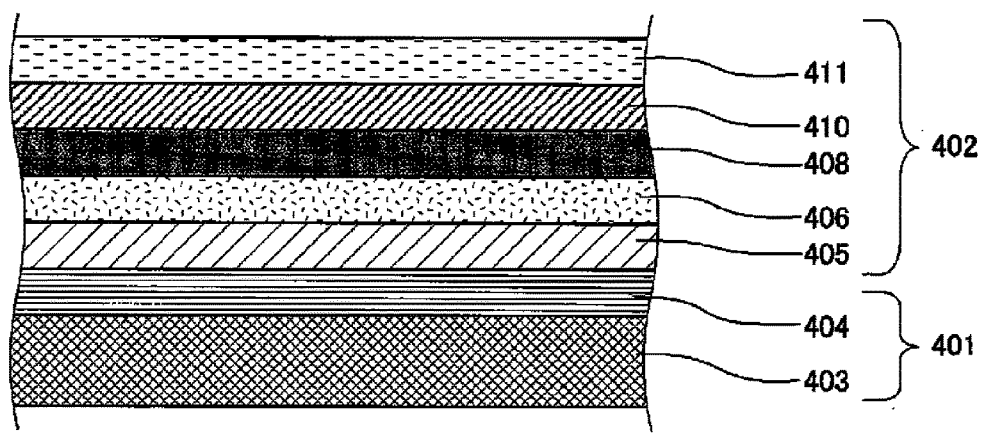
FIG. 7 is an enlarged sectional view of a film for in-molding of the related art.
Figure 8:
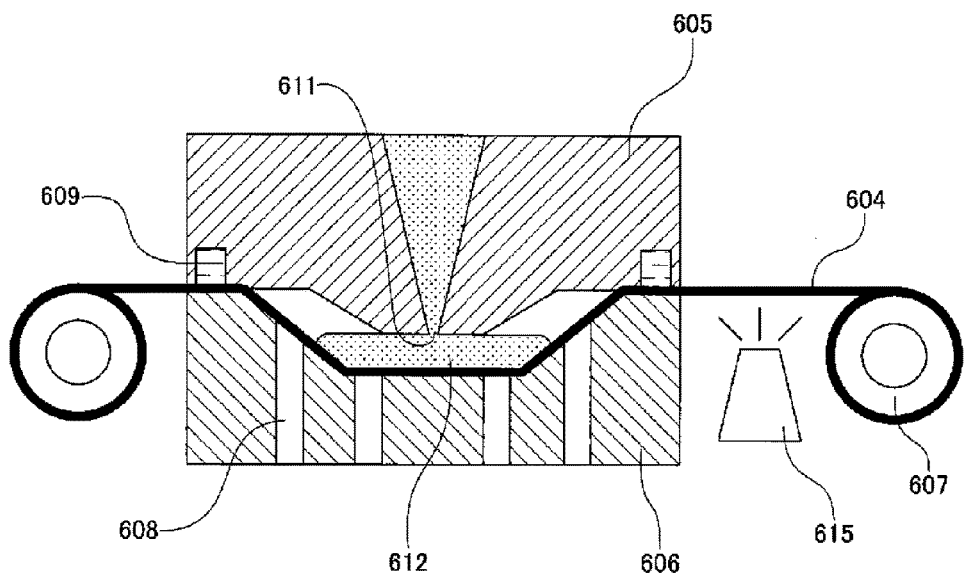
FIG. 8 is a diagram showing a method for manufacturing an in-mold molded product of the related art.

FIG. 2 is a diagram explaining a mechanism of generating a gate mark in an in-molding method of the related art. The same reference numerals are used for the same constituent elements shown in FIG. 7 which was referred to as background technology and the description thereof will be omitted. Reference numeral 203 of FIG. 2 indicates an injection molding resin which is injected from a gate. A resin heat of injection molding resin 203 is radially spread and transferred to each layer in order. Accordingly, the temperatures of adhesive layer 411, hiding layer 410, coloring layer 408, and primer layer 406 formed of a thermoplastic resin respectively approach a glass transition temperature and each layer has fluidity. An ink flow of coloring layer 408 occurs. The ink flow of coloring layer 408 gradually proceeds in accordance with the proceeding of the filling of injection molding resin 203, and when the filling thereof is completed, the ink approaches hard coat layer 405. Accordingly, a gate mark is generated in an in-mold molded product. When an in-mold molded product is in such a state, it is difficult to obtain appearance with high quality.

Figure 3:
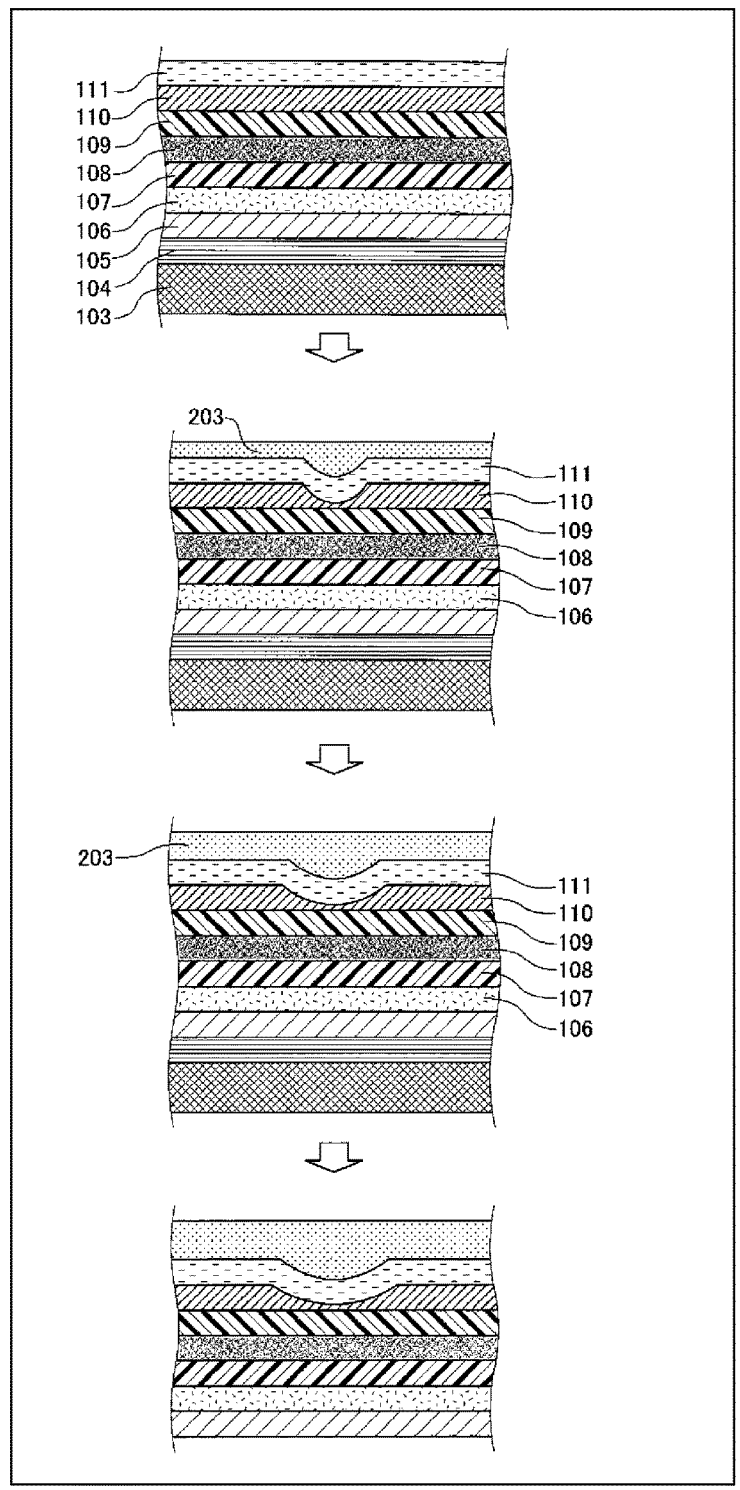
FIG. 3 is a diagram explaining a mechanism of preventing the gate mark failure in an in-molding method of Exemplary Embodiment 1 of the invention.

FIG. 3 is a diagram explaining a mechanism of preventing the gate mark failure in the in-molding method of this exemplary embodiment. The same reference numerals are used for the same constituent elements shown in FIG. 1 and the description thereof will be omitted. Reference numeral 203 of FIG. 3 indicates an injection molding resin which is injected from a gate.

In FIG. 3, a resin heat of injection molding resin 203 is radially spread, and the temperatures of adhesive layer 111 and hiding layer 110 in the vicinity of the gate respectively approach a glass transition temperature and the layers flow. However, in a stage where adhesive layer 111 and hiding layer 110 flow, the transfer of the resin heat is prevented. This is because second inorganic polymer layer 109 formed of a thermosetting resin is interposed between hiding layer 110 and coloring layer 108. The characteristics of inorganic polymer layer 109 formed of a thermosetting resin are different from characteristics of coloring layer 108 formed with an organic material formed of a thermoplastic resin, and inorganic polymer layer does not have fluidity but a curing reaction is promoted therein, when heat is applied.

Accordingly, even when the temperature of coloring layer 108 formed of a thermoplastic resin approaches a glass transition temperature due to an effect of heat of the injection resin and the coloring layer has fluidity, the coloring layer is interposed between inorganic polymer layer 109 formed of a thermosetting resin which does not have fluidity, and thus, the motion of coloring layer 108 and hiding layer 110 formed of a thermoplastic resin is prevented. Accordingly, the gate flow can be prevented. Therefore, it is possible to prevent the gate mark failure caused by the flow of ink.

Here, when the glass transition temperature of inorganic polymer layers 107 and 109 formed of a thermosetting resin is higher than the glass transition temperature of coloring layer 108 formed of a thermoplastic resin, a layer configuration in which the ink flow hardly occurs with respect to a molding resin having a higher injection temperature is obtained.

Figure 4:
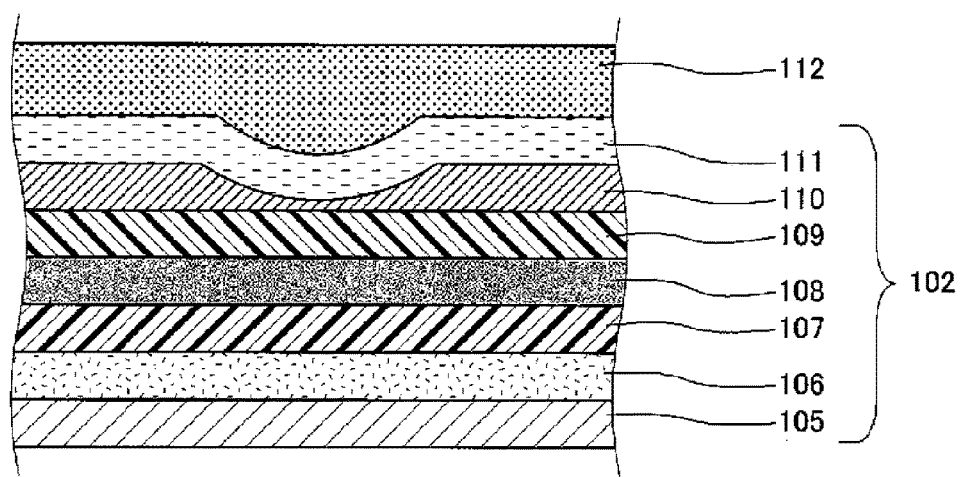
FIG. 4 is an enlarged sectional view of an in-mold molded product of Exemplary Embodiment 1 of the invention.

FIG. 4 is an enlarged sectional view of an in-mold molded product manufactured through the in-molding method shown in FIG. 3 and of an in-mold molded product of this exemplary embodiment. Reference numeral 112 of FIG. 4 indicates an injection molding resin in a cooled and solidified state. In the film for in-molding, only transfer film 102 is transferred to a surface of injection molding resin 112 and the carrier film is not transferred thereto.

As the injection molding resin, polycarbonate, or 20% of a polyglass filler including a glass filler is used, for example. The effects described above are confirmed, when an injection temperature is, for example, equal to or higher than 280° C. and equal to or lower than 320° C., and more specifically, an injection resin temperature is 300° C., a die temperature is 100° C., and a cycle time is 45 seconds.

When forming inorganic polymer layers 107 and 109, a sol-gel method is preferably used. Specifically, a sol-gel coating material including a thermosetting resin permeates primer layer 106 and coloring layer 108 and is dried to form inorganic polymer layers 107 and 109. When a thermosetting resin in the sol-gel coating material permeates primer layer 106 and coloring layer 108, a thermosetting resin in the sol-gel coating material enters primer layer 106 and coloring layer 108 together with a solvent and fixed therein, and accordingly, an anchor effect is efficiently obtained between inorganic polymer layers 107 and 109 which are formed of a thermosetting resin and provided between primer layer 106 and coloring layer 108 formed of a thermoplastic resin. When heat is applied to inorganic polymer layers 107 and 109 in this state, a curing reaction of inorganic polymer layers 107 and 109 is further promoted, a crosslink density of inorganic polymer layers 107 and 109 is increased, and it is possible to improve strength of the layers.

Inorganic polymer layers 107 and 109 may be configured with only a matrix resin or may include metal oxide microparticles. An effect of including metal oxide microparticles is as follows. When metal oxide microparticles are added into the inorganic polymer, voids are formed between the matrix resin and the metal oxide. When voids are included in the inorganic polymer layers, it is possible to exhibit a thermal insulation effect or elasticity at the time of molding.

As the matrix resin, a silicone resin formed of a siloxane bond or a resin having a molecular structure in which zirconia or titania is included in a main skeleton, such as metal alkoxide, zirconium alkoxide, or titanium alkoxide is considered.

As the metal oxide, it is preferable that one or more kinds meal oxide is selected from silicon oxide, magnesium oxide, cryolite, calcium oxide, aluminum oxide, boron oxide, zirconium oxide, titanium oxide, hafnium oxide, and cerium oxide, for example. Metal oxide microp articles other than the above-mentioned metal oxides may be used, as long as the same effect is obtained.

It is desirable that a proportion of the oxide particles is equal to or greater than 5% by mass and equal to or smaller than 90% by mass. When the proportion of the oxide particles is smaller than 5% by mass, a thermal insulation effect and elasticity at the time of molding are not sufficiently exhibited in inorganic polymer layers 107 and 109, and in a case where the proportion thereof is greater than 90% by mass, it is difficult to maintain interlayer adhesiveness between inorganic polymer layers and an organic material formed of a thermoplastic resin.

Films for in-molding in which a film thickness of inorganic polymer layers 107 and 109 formed as described above is 0.01 μm, 0.05 μm, 0.2 μm, 0.4 μm, and 0.5 μm were formed, in-mold molded products were manufactured using these films for in-molding, and generation of a gate mark was observed. When the film thickness of inorganic polymer layers 107 and 109 was 0.01 μm, the effect was slight, and when the film thickness thereof was equal to or greater than 0.2 μm, cracks were generated due to thermal contraction at the time of drying in a stage of manufacturing a film. It was also found that, when a structure in which coloring layer 108 is interposed between first inorganic polymer layer 107 and second inorganic polymer layer 109 was not provided, an effect of preventing a gate mark was small. It was found that, when the film thickness of inorganic polymer layers 107 and 109 was 0.4 μm, gate mark resistance was obtained, but after forming a deep-drawing molded product, the film did not follow the extension at the time of molding, ink cracks were generated in corners of the molded product, and it was difficult to provide a product having appearance with high quality. Accordingly, the film thickness of the inorganic polymer layers which is equal to or greater than 0.05 μm and smaller than 0.2 μm can be considered as a film thickness having gate mark resistance and extensibility so as to withstand even a deep-drawing molded product.

Base film 103 of carrier film 101 is configured with a material such as a PET or acrylic film, and a film thickness thereof is generally selected in a range of 20 μm to 100 μm inclusive and is, for example, 50 μm. Peeling layer 104 is formed on base film 103 so that the film thickness thereof becomes, for example, 0.1 μm to 3 μm inclusive.

As a method of providing inorganic polymer layer 107 on primer layer 106 of transfer film 102, a wet method is used. For example, any one of a coating method and a printing method may be used. As the printing method, gravure printing, screen printing, or ink jet printing is used. In a case of gravure printing, a standard film thickness is 0.1 to 2 μm inclusive for a layer, in a case of screen printing, a standard film thickness is 0.5 to 3 μm inclusive for a layer, and in a case of ink jet printing, a standard film thickness for a layer is 0.5 to 10 μm inclusive for one layer. It is preferable that the film thickness for a layer is 0.1 to 10 μm inclusive. The film thickness for a layer which is smaller than 0.1 μm is not suitable for decoration, because a desired color cannot be realized. A case where the film thickness for a layer is greater than 10 μm means that the film thickness of the transfer film is great, and accordingly, foil cutting properties on a part line of a die at the time of molding are deteriorated. This is because, when foil cutting properties are deteriorated, quality of appearance of edges of an in-mold molded product is deteriorated.

The layer configuration of the invention may be obtained by using the single printing method or in combination of the plurality of printing methods described above. Specifically, each layer of transfer film 102 is formed so that, in regards to an average film thickness of each layer configuring transfer film 102, the average film thickness of protective layer or hard coat layer 105 is 5 μm, the average film thickness of primer layer 106 is 2 μm, the average film thickness of coloring layer 108 is 2 μm, the average film thickness of inorganic polymer layer 109 is equal to or greater than 0.05 μm and smaller than 0.2 μm, the average film thickness of hiding layer 110 is 2 μm, and the average film thickness of adhesive layer 111 is 2 μm. As protective layer or hard coat layer 105, an after-curing type layer is used, for example. In this exemplary embodiment, the layers other than coloring layer 108 and inorganic polymer layers 107 and 109 are not compulsory constituent elements, and accordingly, the usage thereof is determined in accordance with purposes.

Exemplary Embodiment 2

Figure 5:
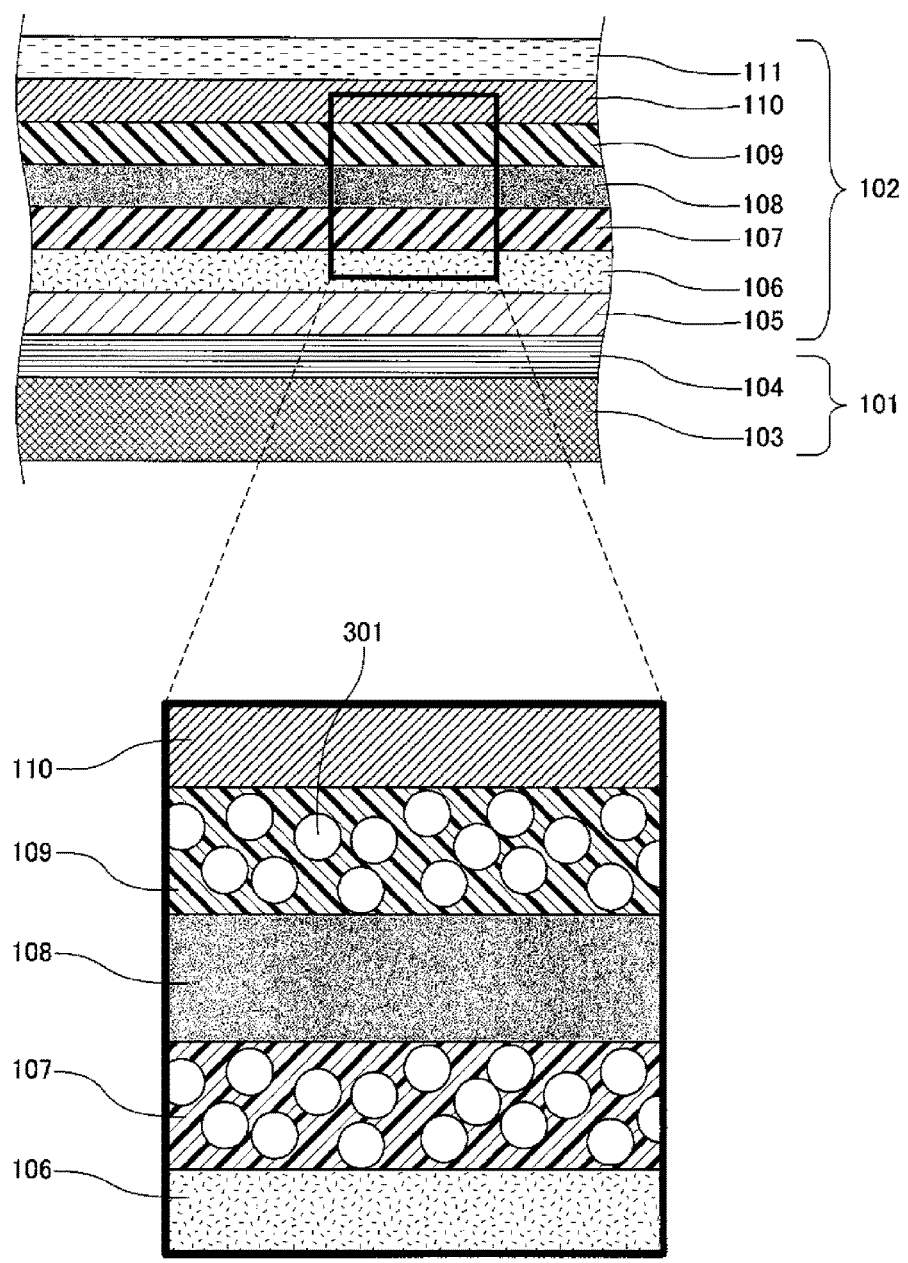
FIG. 5 is an enlarged sectional view of a film for in-molding of Exemplary Embodiment 2 of the invention.

FIG. 5 is an enlarged sectional view of a film for in-molding of Exemplary Embodiment 2 of the invention and is a view obtained by further enlarging a part of the enlarged sectional view. The same reference numerals are used for the same constituent elements shown in FIG. 1 and the description thereof will be omitted. A film for in-molding of Exemplary Embodiment 2 of the invention includes porous fillers 301 in first inorganic polymer layer 107 and second inorganic polymer layer 109 interposing coloring layer 108. When a film for in-molding having this configuration is manufactured, a film for in-molding in which a gate flow hardly occurs even when an injection resin is used at a higher temperature is provided. Other configurations are the same as those in Exemplary Embodiment 1 and therefore, the description thereof will be omitted.

In the film for in-molding of Exemplary Embodiment 2, since first inorganic polymer layer 107 and second inorganic polymer layer 109 include porous fillers 301, it is possible to improve heat resistance of first inorganic polymer layer 107 and second inorganic polymer layer 109 and prevent thermal conduction to coloring layer 108 or primer layer 106. That is, in Exemplary Embodiment 1, the motion of coloring layer 108 is stopped by interposing coloring layer 108 having a temperature approached to a temperature for flowing between inorganic polymer layers 107 and 109, whereas in Exemplary Embodiment 2, in addition to the effects described above, it is possible to prevent that the temperature of coloring layer 108 approaches a temperature at which the coloring layer flows. The temperature of the film could not be measured due to problems, but the effects were confirmed, when an injection temperature is from 310° C. to 340° C., specifically, an injection resin temperature is 325° C., a die temperature is 110° C., a cycle time is 45 seconds, and a molding resin material includes 40% of polyglass filler.

An average particle diameter of porous fillers 301 is preferably in a range of equal to or greater than 0.01 μm and smaller than 0.05 μm, but it is not particularly limited, as long as a thermal insulation effect is obtained. As the kind of porous fillers 301, silica or talc which is semitransparent and has a little effect on a color of ink is effective, but it is not particularly limited, as long as a thermal insulation effect is obtained. The metal oxides described above may be used as the porous fillers. A method for manufacturing porous fillers 301 is not particularly limited, either, as long as it is a method capable of manufacturing porous fillers 301 having a thermal insulation effect. When silica is used as an example, various kinds of silica such as spherical silica or colloidal silica, ground silica, or porous silica are provided depending on a difference in processing method. An amount of porous fillers 301 added is not particularly limited, as long as a thermal insulation effect is obtained when performing injection molding.

Next, an example of a specific process of manufacturing an in-mold molded product using the film for in-molding of Exemplary Embodiments 1 and 2 will be described with reference to FIGS. 6A to 6H. First, in a step shown in FIG. 6A, film for in-molding 604 is transported by foil feeder 607 so that predetermined designs such as a color, a pattern, or a design to be realized by a coloring layer of a transfer film are disposed at a predetermined position between fixed die 605 and movable die 606. At this time, the film for in-molding is transported so that a carrier film of film for in-molding 604 faces movable die 606 and an adhesive layer of film for in-molding 604 faces fixed die 605. Film for in-molding 604 is heated to a predetermined temperature in advance by preheater 615 before molding to have elasticity so that film for in-molding 604 is sufficiently shaped in accordance with dies in the next step.

Figure 6A:
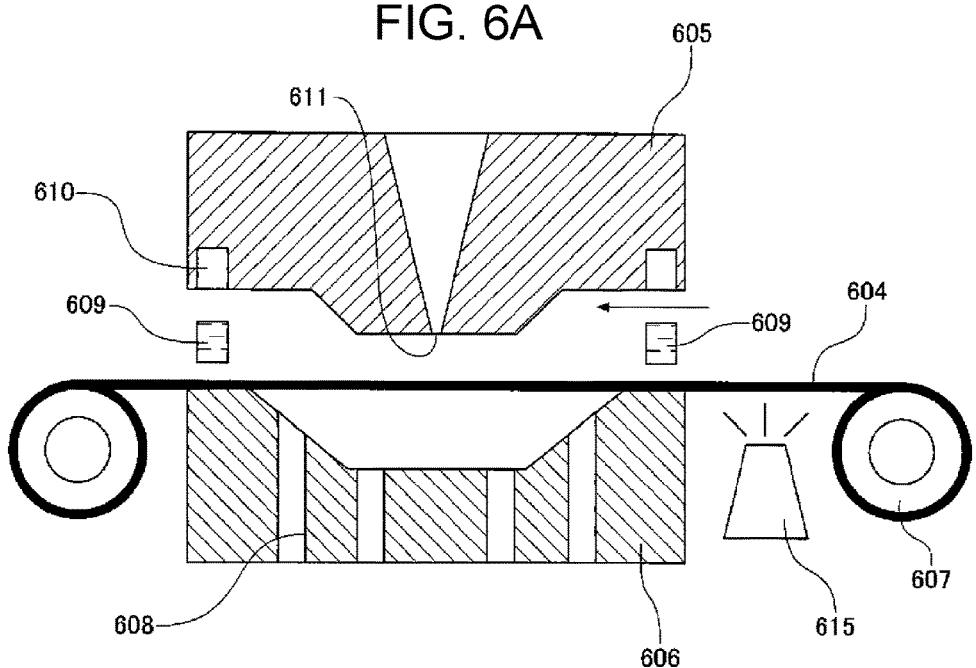
FIG. 6A is a diagram explaining a method for manufacturing an in-mold molded product of Exemplary Embodiments 1 and 2 of the invention.
Figure 6B:
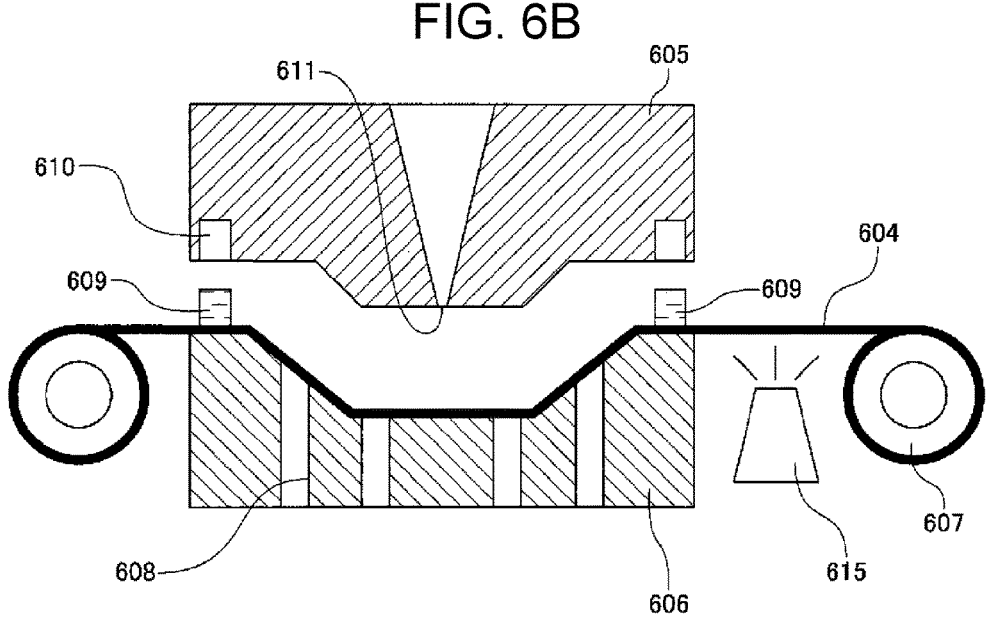
FIG. 6B is a diagram explaining the same method for manufacturing an in-mold molded product.

Then, in a step shown in FIG. 6B, film for in-molding 604 is sucked from suction holes 608 opened on a cavity surface of movable die 606 to tightly attach film for in-molding 604 to the cavity surface of movable die 606. Accordingly, film for in-molding 604 is shaped in accordance with the cavity surface. At this time, film for in-molding 604 is fixed by frame-shaped film pressing members 609 and film for in-molding 604 is positioned.

Figure 6C:
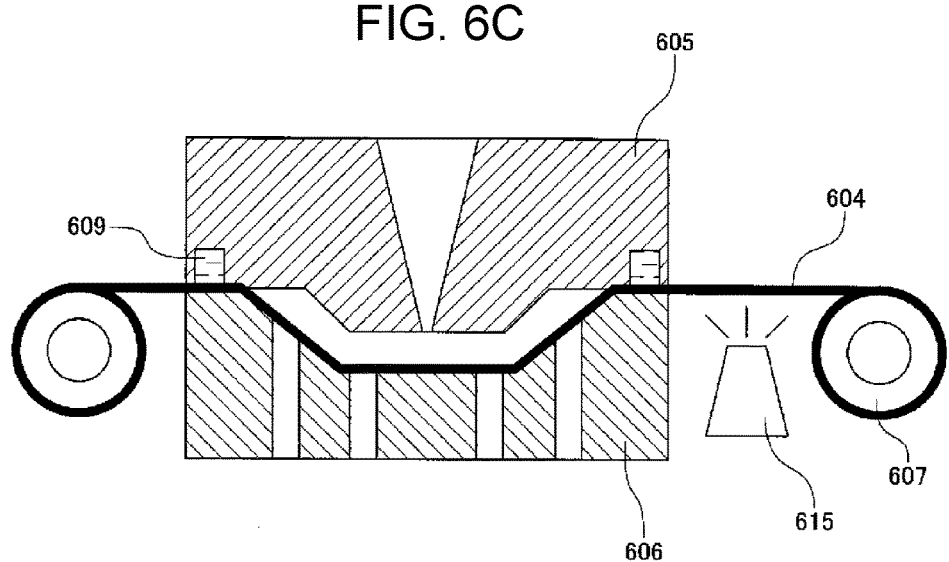
FIG. 6C is a diagram explaining the same method for manufacturing an in-mold molded product.

Then, in a step shown in FIG. 6C, movable die 606 is moved to clamp fixed die 605 and movable die 606 together, and a cavity is formed. At this time, film pressing members 609 are accommodated in accommodation recesses 610 (see FIGS. 6A and 6B) formed in fixed die 605.

Figure 6D:
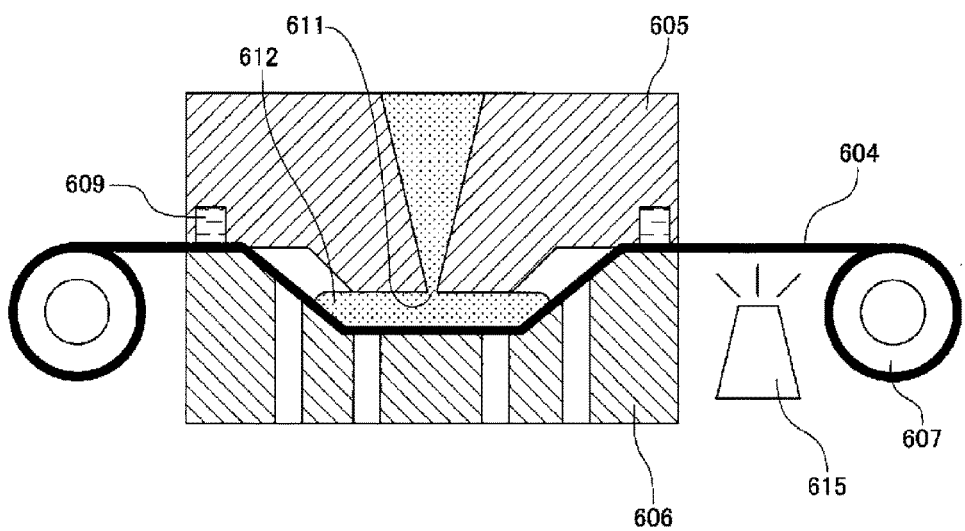
FIG. 6D is a diagram explaining the same method for manufacturing an in-mold molded product.

Next, in a step shown in FIG. 6D, molten injection molding resin 612 is injected towards an adhesive layer of film for in-molding 604 from gate 611 of fixed die 605, fixed die 605 and movable die 606 are clamped together, and accordingly, molten injection molding resin 612 is injected into the cavity formed. Thus, the cavity is filled with molten injection molding resin 612.

Figure 6E:
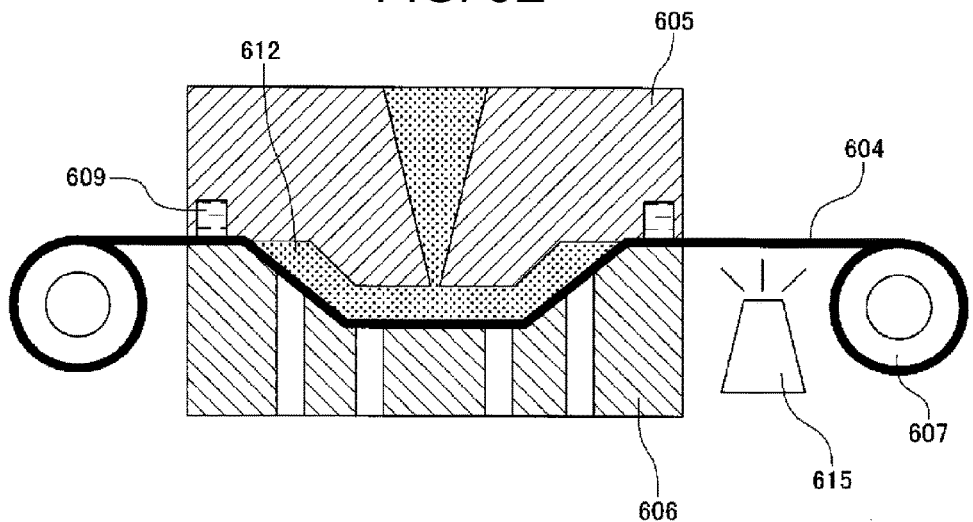
FIG. 6E is a diagram explaining the same method for manufacturing an in-mold molded product.
Figure 6F:
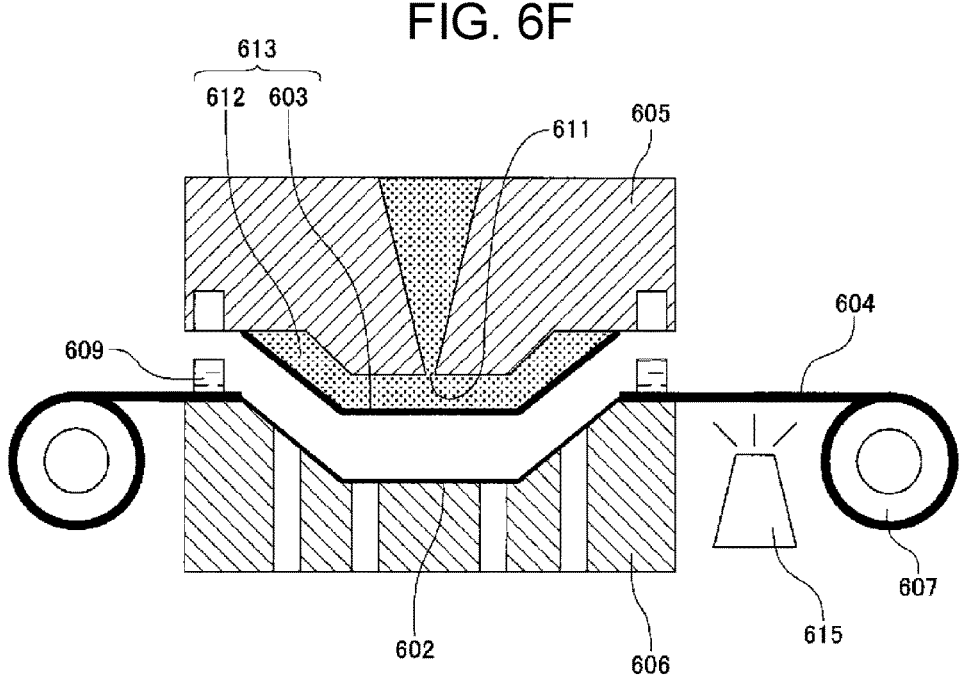
FIG. 6F is a diagram explaining the same method for manufacturing an in-mold molded product.

After the filling with molten injection molding resin 612 is completed, in a step shown in FIG. 6E, molten injection molding resin 612 is cooled to a predetermined temperature and solidified. Then, in a step shown in FIG. 6F, movable die 606 is moved to release fixed die 605 and movable die 606 from each other. At this time, transfer film 603 attached to a surface of solidified (formed) injection molding resin 612 is peeled off from carrier film 602. Accordingly, it is possible to obtain in-mold molded product 613 having a surface to which only transfer film 603 is transferred. In-mold molded product 613 obtained is in a state where a protective layer or a hard coat layer of transfer film 603 appears on the surface.

Figure 6G:
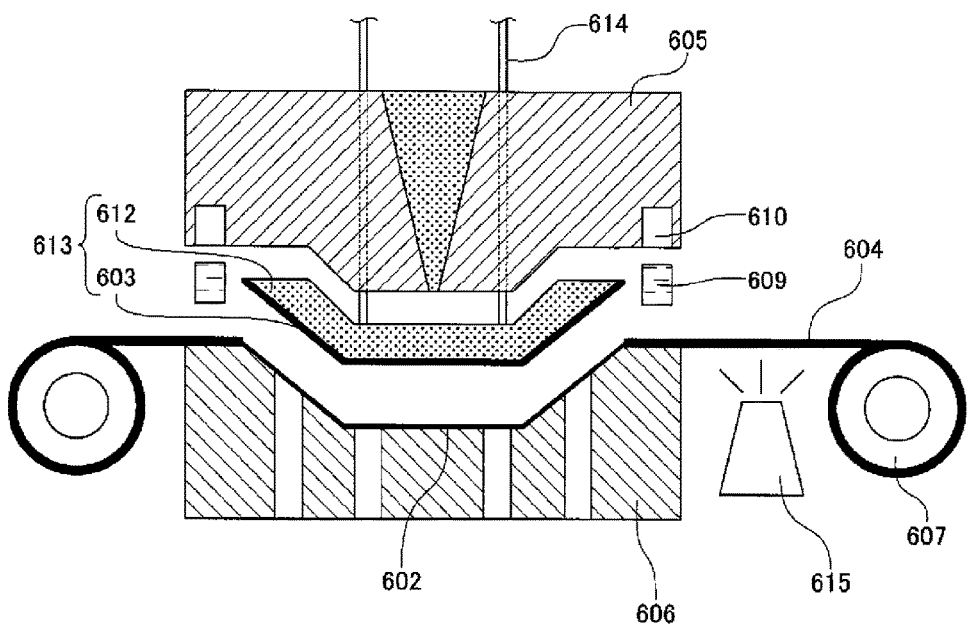
FIG. 6G is a diagram explaining the same method for manufacturing an in-mold molded product.
Figure 6H:
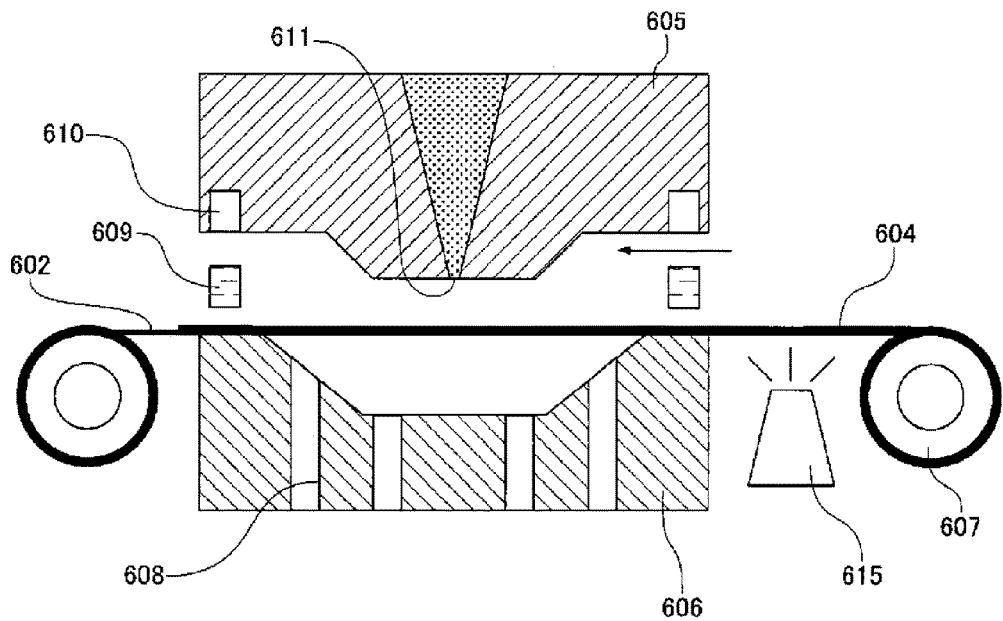
FIG. 6H is a diagram explaining the same method for manufacturing an in-mold molded product.

Next, in a step shown in FIG. 6G, knock-out pins 614 are pressed out from fixed die 605 to extract in-mold molded product 613. After the extracting of in-mold molded product 613 is completed, in a step shown in FIG. 6H, suction of carrier film 602 to the cavity surface due to suction from suction holes 608 of movable die 606 is stopped and film for in-molding 604 is transported by foil feeder 607 to be prepared for next molding. At this time, film for in-molding 604 heated to a predetermined temperature in advance by preheater 615 is transported so that predetermined designs such as a color, a pattern, or a design to be realized by the coloring layer thereof are disposed at a predetermined position between fixed die 605 and movable die 606. By repeating these steps, it is possible to continuously manufacture in-mold molded product 613.

As described above, when a coloring layer of a film for in-molding is interposed between inorganic polymer layers and porous fillers, for example, are included in the inorganic polymer layers, it is possible to realize a state in which the film for in-molding follows the extension at the time of shaping and no gate mark is generated, during the manufacturing process of an in-mold molded product, and thus, a molded product having appearance with high quality is obtained.

A polycarbonate resin or a high-temperature molding resin obtained by mixing glass fillers thereto was mainly used for the interior of vehicles or exterior of smart phones, and a decorative film having heat resistance when performing decoration of a molded product using in-molding was required. With the invention, it is thought that the spread of the film for product purposes is further accelerated.

The invention claimed is:

1. A film for in-molding comprising:
a transfer film which is transferred to a surface of an injection molding resin; and
a carrier film which is not transferred,
wherein the transfer film includes a coloring layer which includes ink which is an organic material formed of a thermoplastic resin and applies a design to an in-mold molded product, and inorganic polymer layers formed of a thermosetting resin, and
the coloring layer is into contact with the inorganic polymer layers and is interposed between the inorganic polymer layers.

2. The film for in-molding of claim 1,
wherein a glass transition temperature of the inorganic polymer layers is higher than a glass transition temperature of the coloring layer.

3. The film for in-molding of claim 1,
wherein the inorganic polymer layers are formed by using a sol-gel method.

4. The film for in-molding of claim 1,
wherein the inorganic polymer layers comprise metal oxide microparticles and an inorganic matrix resin, and a proportion of the metal oxide microparticles is from 5% by mass to 90% by mass inclusive.

5. The film for in-molding of claim 4,
wherein the metal oxide microparticles are porous fillers.

6. The film for in-molding of claim 1,
wherein a film thickness of each of the inorganic polymer layers is equal to or greater than 0.05 µm and smaller than 0.2 µm.

7. The film for in-molding of claim 1,
wherein the carrier film comprises in a stacked state,
a base film which continuously supplies the transfer film, and
a peeling layer which is provided for peeling the transfer film from the base film, and
the transfer film comprises in a stacked state,
a protective layer or a hard coat layer which protects an in-mold molded product,
a primer layer which connects the protective layer or the hard coat layer and the inorganic polymer layers to each other,
a first inorganic polymer layer which is a part of the inorganic polymer layers,
the coloring layer,
a second inorganic polymer layer which is a part of the inorganic polymer layers,
a hiding layer which hides a color of the coloring layer, and
an adhesive layer which bonds the transfer film to an injection molding resin.

8. An in-mold molded product comprising:
the transfer film of the film for in-molding of claim 1; and
an injection molding resin having a surface to which the transfer film is transferred.

9. A method for manufacturing an in-mold molded product comprising:
the disposing the film for in-molding of claim 1 between a first die and a second die;
flowing a molten injection molding resin into a cavity formed by clamping the first die and the second die together;
cooling and solidifying the injection molding resin flowed into the cavity; and
releasing the first die and the second die from each other to extract an in-mold molded product including the cooled injection molding resin and the transfer film formed on a surface of the in-mold molded product.

* * * * *